(12) United States Patent
Ohishi et al.

(10) Patent No.: US 6,889,807 B2
(45) Date of Patent: May 10, 2005

(54) ONE-WAY CLUTCH APPARATUS

(75) Inventors: Hiroyuki Ohishi, Hamakita (JP); Hideharu Ohishi, Shizouka (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/358,190

(22) Filed: Feb. 5, 2003

(65) Prior Publication Data
US 2003/0155203 A1 Aug. 21, 2003

(30) Foreign Application Priority Data
Feb. 15, 2002 (JP) .................................. 2002-039098

(51) Int. Cl.[7] .............................................. F16D 41/066
(52) U.S. Cl. ................................. 192/45; 192/110 B
(58) Field of Search ............................. 192/45, 113.5, 192/110 B, 113.32, 45.1; 384/302; 60/345

(56) References Cited

U.S. PATENT DOCUMENTS 6,044,945 A * 4/2000 Muramatsu .................. 192/45
6,092,636 A 7/2000 Muramatsu ................ 192/53.1
6,338,402 B1 * 1/2002 Muramatsu et al. .......... 192/45
6,640,948 B2 * 11/2003 Shirataki et al. ........ 192/113.32
2002/0134636 A1 * 9/2002 Ando ..................... 192/110 B

* cited by examiner

*Primary Examiner*—Rodney H. Bonck
(74) *Attorney, Agent, or Firm*—Miles & Stockbridge P.C.

(57) ABSTRACT

A one-way clutch apparatus comprises an inner ring, an outer ring disposed to be coaxial with the inner ring and rotatable relatively thereto, a plurality of concave grooves formed in an axial direction in an inner peripheral surface of the outer ring, and block bearings engaging the respective concave grooves and keeping an interval between the inner ring and the outer ring. The concave groove takes such a configuration that a surface including two or more circular arc surfaces connects side surfaces extending in radial directions to a bottom surface extending in a peripheral direction, which configure the concave groove.

19 Claims, 6 Drawing Sheets

ONE-WAY CLUTCH APPARATUS

This application claims the benefit of Japanese Patent application No. 2002-039098 which is hereby incorporated by reference.

BACKGROUND OF THE INVENTION

1. Field of the Invention

The present invention relates to a one-way clutch apparatus incorporated into an automatic transmission for an automobile.

2. Related Background Art

Generally, an automatic transmission for an automobile includes a planetary gear transmission mechanism having approximately third through fifth gears in addition to a torque converter classified as a fluid coupling, wherein a speed change is made by properly fixing or releasing components (such as a sun gear, a planetary gear, etc.) of the planetary gear transmission mechanism through a frictional engaging means such as a clutch, a brake, etc. The frictional engaging means incorporated into the automatic transmission involves the use of a wet type multiple disc in which frictional plates and separator plates are alternately disposed excluding some of band brakes. Press-fitting between these two involves using a pressure oil given from a variable speed control hydraulic circuit. Further, these frictional engaging means adopt some of mechanisms for actualizing facilitation of the variable speed control by having the one-way clutch built in an interior thereof and rotating a gear shaft, etc. in one rotating direction without any restriction.

FIG. 6 is a front view showing one example of a conventional one-way clutch apparatus incorporated into the frictional engaging means. FIG. 7 is an enlarged view of a portion E in FIG. 6.

A one-way clutch 1 comprises a cylindrical inner ring (an output shaft, an input shaft, etc. of an automatic transmission) 3, an annular outer ring 5 so disposed as to be coaxial with the inner ring 3 and rotatable relatively thereto, and a multiplicity of circular cylindrical rollers 7 defined as torque transfer members interposed between the inner ring 3 and the outer ring 5. An inner peripheral surface of the outer ring 5 is formed with a plurality of concave cams 13 each configured by a trough portion 9 and an inclined surface 11 that are formed in a circumferential direction, and with a plurality of concave grooves 15 formed in an axial direction. Each roller 7 is disposed between an outer peripheral surface of the inner ring 3 and the concave cam 13, and is biased by an accordion spring 17 against the inclined surface 11 within the concave cam 13. Further, an outer radially outwardly projected edge portion 21 of a block bearing 19 composed of an oil-retaining sintered alloy engages with each concave groove 15, and the block bearing 19 serves to keep an interval between the inner ring 3 and the outer ring 5. What is indicated by a numeral 22 in the drawings is an engaging pawl formed on the outer periphery of the outer ring 5. This engaging pawl 22 engages with an engaging groove formed in an inner peripheral surface of an unillustrated transmission-related element.

The outer ring 5 is fitted with a retainer 23 composed of a synthetic resin, which is configured by connecting a first annular flange 25 having a large diameter to a second annular flange 27 having a small diameter by columns 29, 31, 33, 35 extending in the axial direction. This retainer 23 prevents the rollers 7, the accordion springs 17 and the block bearings 19 from separating and coming off. For example, a couple of the roller 7 and the accordion spring 17 are interposed and held in between the columns 29 and 35 adjacent to each other, between the columns 31 and 33 adjacent to each other, and between the columns 33 and 35 adjacent to each other, and the block bearing 19 is interposed and held in between the columns 29 and 31 adjacent to each other. The numeral 37 in the drawings is a lip formed in the column 29 and engaging with a protruded portion 39 formed on an outer end portion of the block bearing 19.

In the conventional one-way clutch apparatus, the concave groove 15 with which the block bearing 19 engages is configured by the two side surfaces extending in the radial directions and the one bottom surface extending in the peripheral direction, and these surfaces are connected respectively by the circular arc surfaces. The outer edge portion 21 of the block bearing 19 engages with this concave groove 15, thereby keeping the relative interval between the inner ring 3 and the outer ring 5 and transferring the rotational motion. When the inner ring 3 and the outer ring 5 relatively rotate, the outer edge portion 21 of the block bearing comes into the surface-contact with side surface, extending in the peripheral direction, of the concave groove 15, and stresses generated due to a change in the relative interval concentrates on the concave groove 15, resulting in fatigue fractures in the outer end portion 21 of the block bearing 19 and in the concave groove 15.

SUMMARY OF THE INVENTION

It is a primary object of the present invention, which was devised under such circumstances, to provide a one-way clutch apparatus scheming to attain a longer life-time by forming a concave groove taking a configuration suited to dispersing stresses.

To accomplish the above object, according to one aspect of the present invention, a one-way clutch apparatus includes an inner ring, an outer ring disposed so as to be coaxial with the inner ring and rotatable relatively thereto, a plurality of concave grooves formed in an axial direction in an inner peripheral surface of the outer ring, and block bearings engaging the respective concave grooves and keeping an interval between the inner ring and the outer ring, wherein the concave groove takes such a configuration that a surface including two or more circular arc surfaces connects side surfaces extending in radial directions to a bottom surface extending in a peripheral direction, which configure the concave groove.

In the one-way clutch apparatus according to the present invention, it is desirable that the side surfaces extending in the radial directions be connected to the bottom surface extending in the peripheral direction by one or more flat surfaces and two or more circular arc surfaces.

In the one-way clutch apparatus according to the present invention, the one or more flat surfaces have an inclined angle $\theta$ having a relationship such as $90° < \theta < 180°$ with respect to the side surfaces extending in the radial directions and the bottom surface extending in the peripheral direction.

According to the present invention, the concentration of stresses on the concave groove is relieved, whereby the longer life-time of the one-way clutch apparatus can be attained.

DETAILED DESCRIPTION OF THE PREFERRED EMBODIMENT

Figure 1:
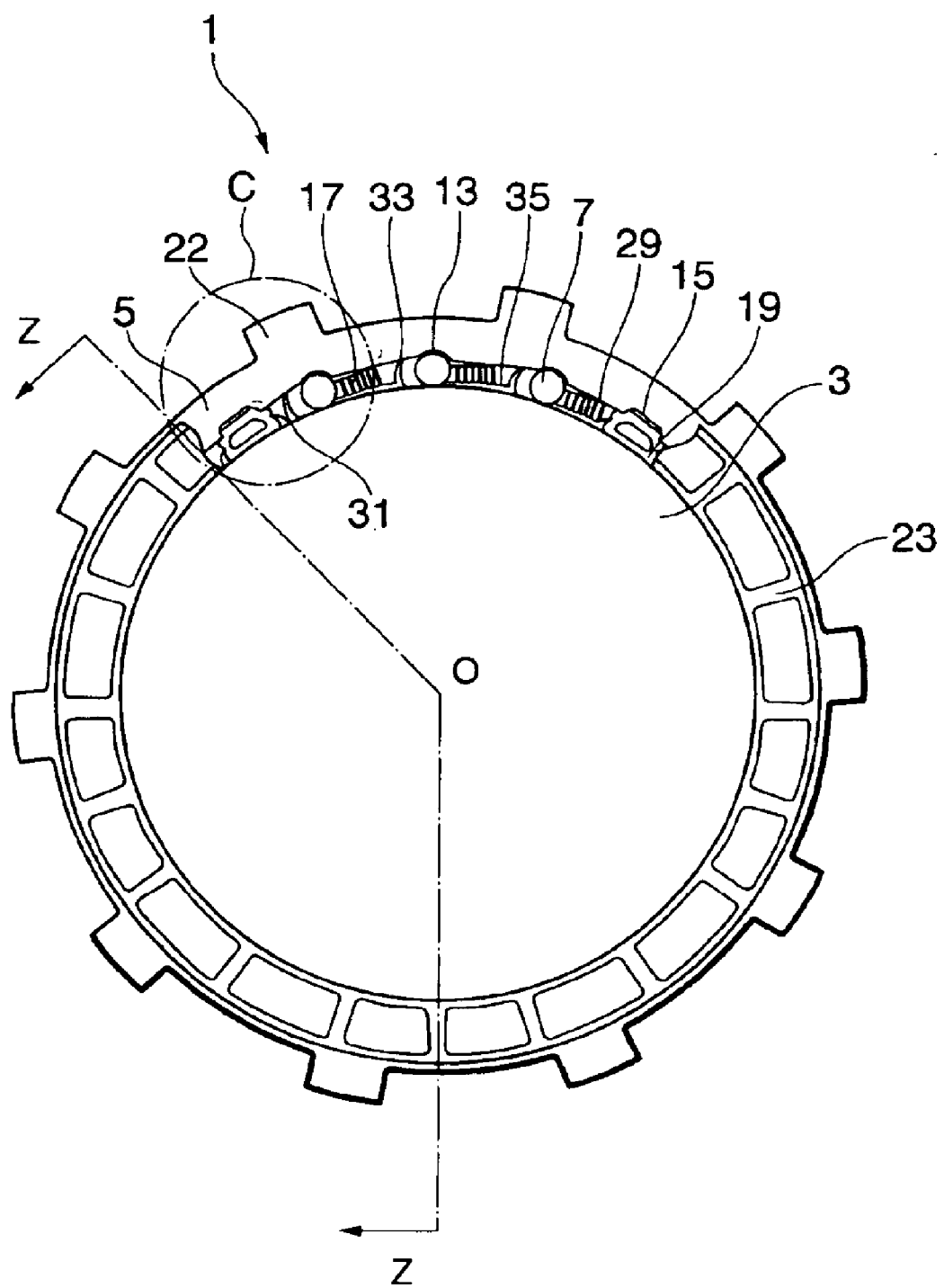
FIG. 1 is a front view showing one embodiment of a one-way clutch apparatus of the present invention, with some portion of retainer being cut off.
Figure 2:
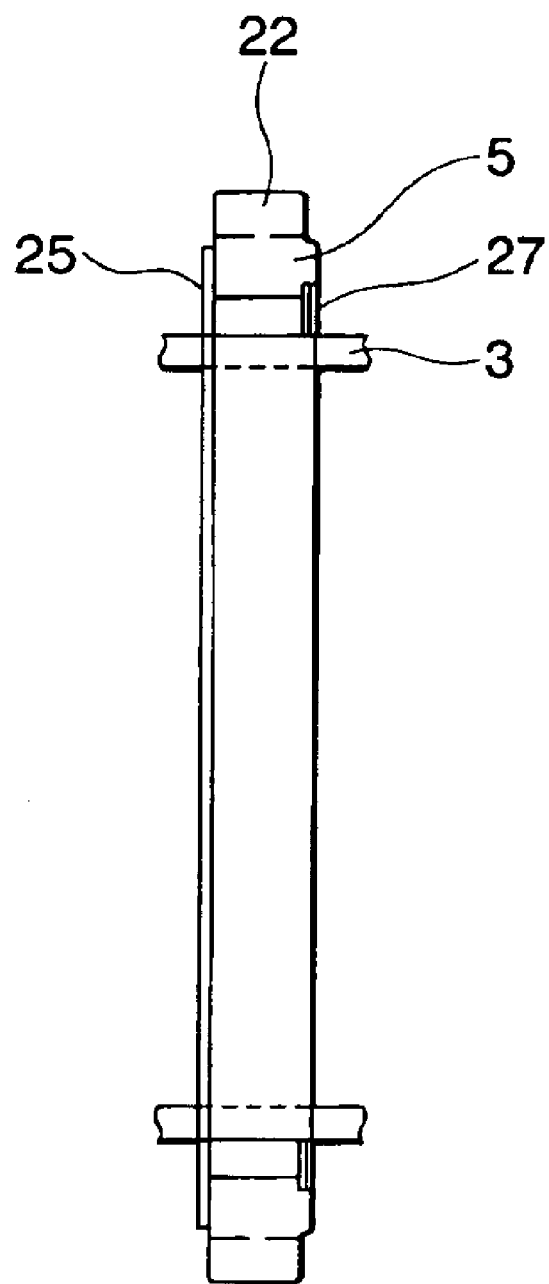
FIG. 2 is a sectional view taken along the line Z—Z in FIG. 1.
Figure 3:
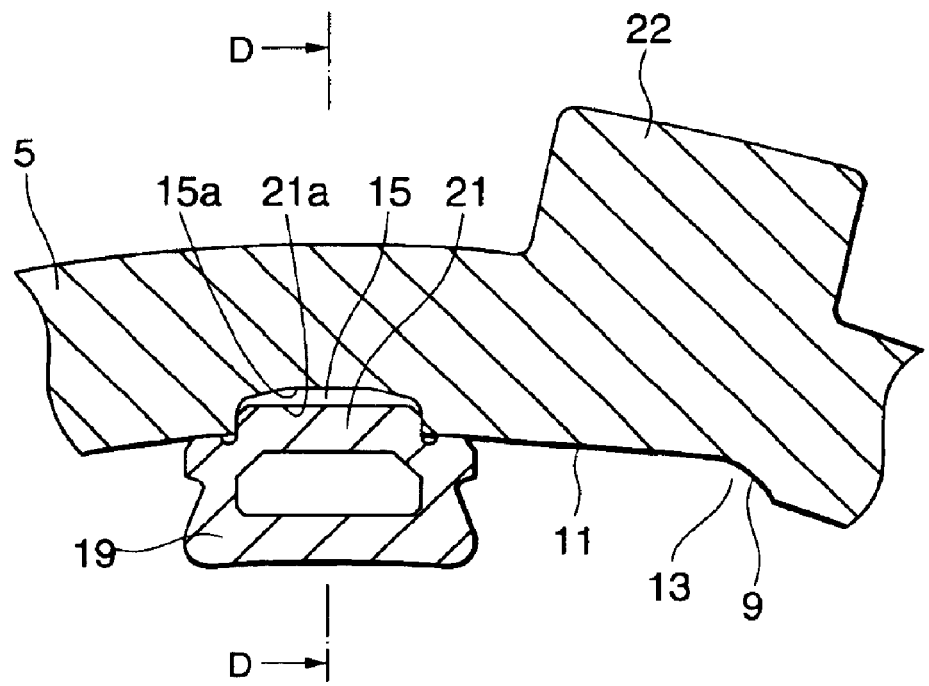
FIG. 3 is an enlarged view of a portion C in FIG. 1.
Figure 4:
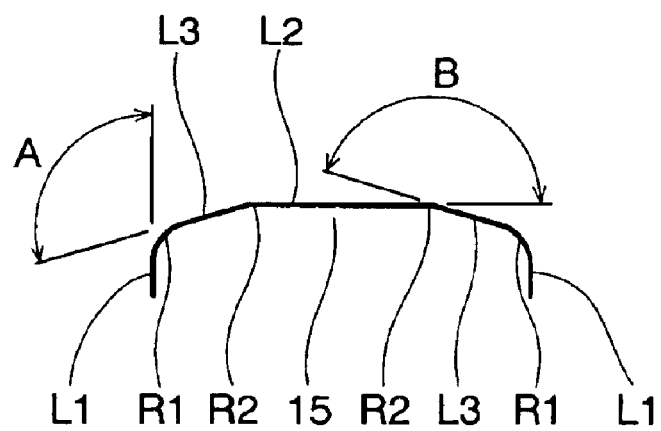
FIG. 4 is a partially enlarged view showing a configuration of a concave groove.
Figure 5:
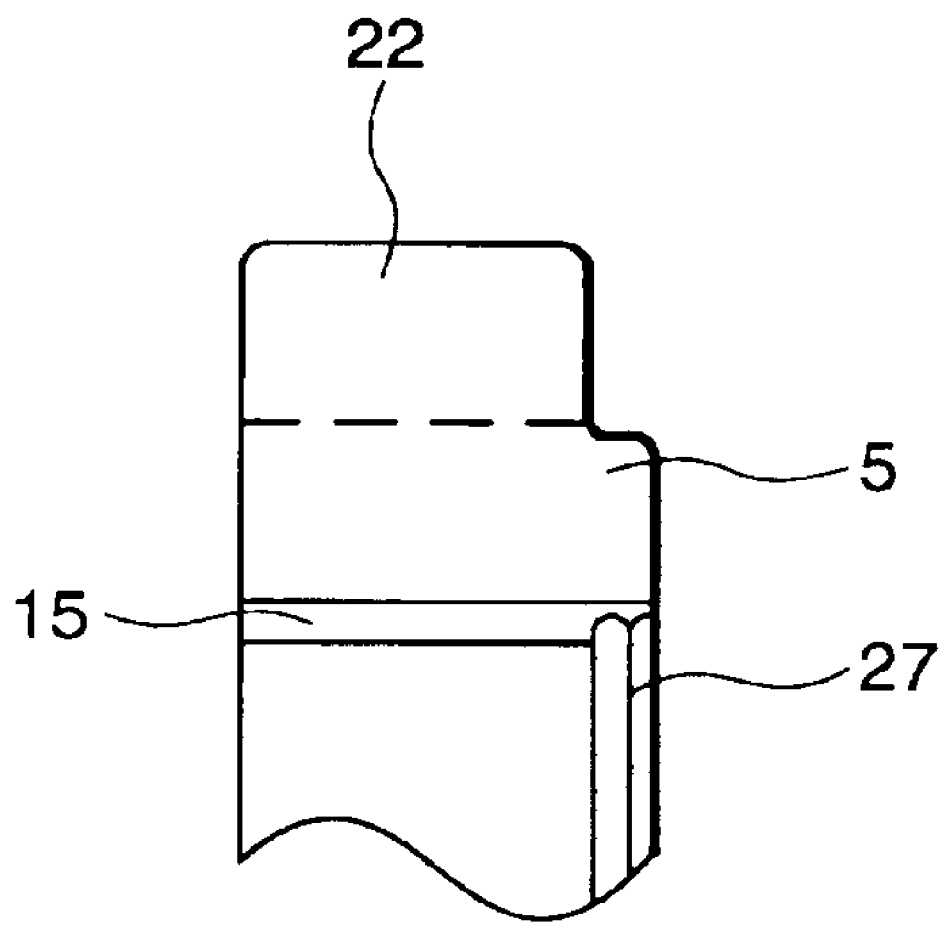
FIG. 5 is a sectional view taken along the line D—D in FIG. 3.
Figure 6:
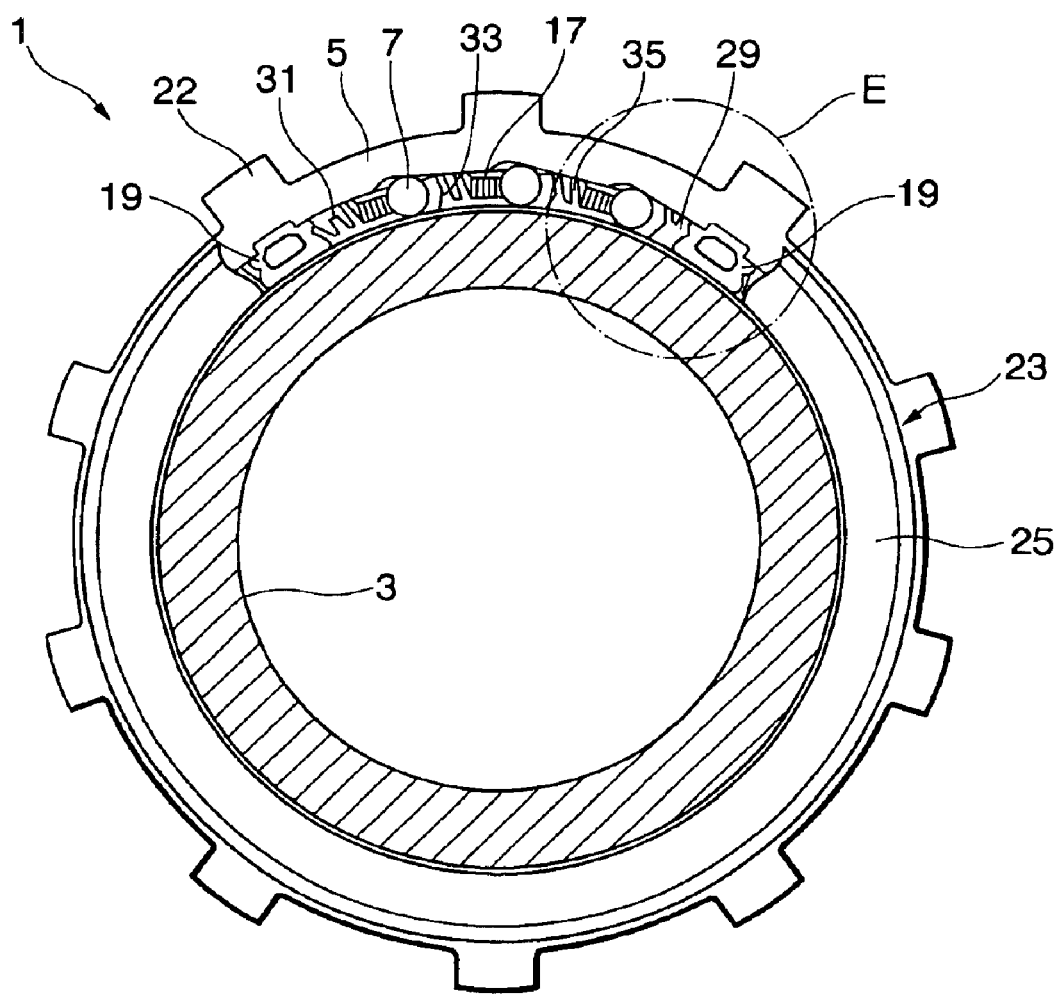
FIG. 6 is a front view showing one example of a conventional one-way clutch apparatus, with some portion of a retainer being cut off.
Figure 7:
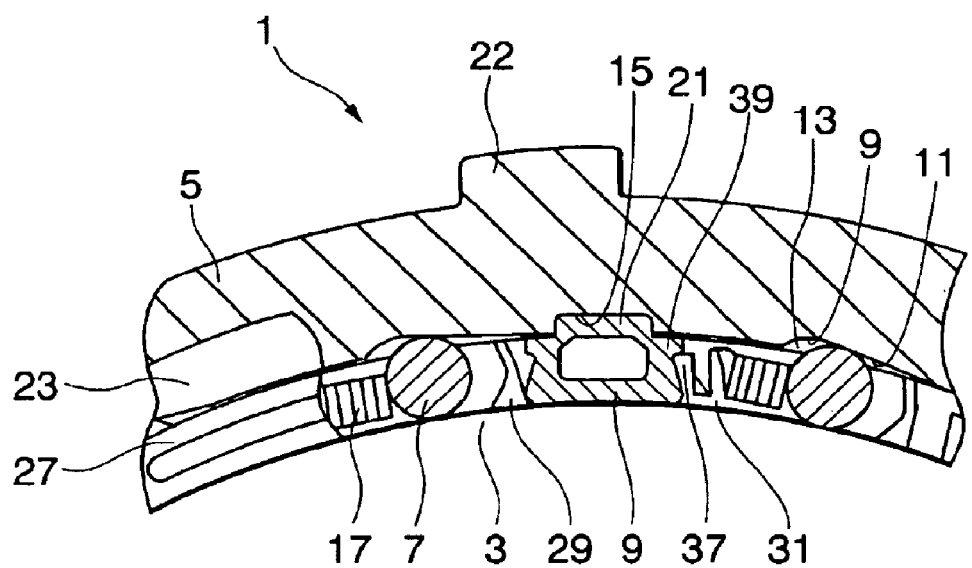
FIG. 7 is an enlarged view of a portion E in FIG. 6.

The present invention will hereinafter be described in detail with reference to the accompanying drawings. FIG. 1 is a front view showing one embodiment of a one-way clutch apparatus according to the present invention, with some portion of a retainer being cut off. FIG. 2 is a sectional view taken along the line Z—Z in FIG. 1. FIG. 3 is an enlarged view of a portion C in FIG. 1. FIG. 4 is a partially enlarged view showing a configuration of a concave groove. FIG. 5 is a sectional view taken along the line D—D in FIG. 3, showing an outer ring portion. Note that one-way clutch apparatus is internally fitted in a frictional engaging means of an automatic transmission for a mobile, and its whole configuration is the same as the conventional apparatus described above.

A one-way clutch 1 comprises a cylindrical inner ring 3, an annular outer ring 5 so disposed as to be coaxial with the inner ring 3 and rotatable relatively thereto, and a multiplicity of circular cylindrical rollers 7 defined as torque transfer members interposed between the inner ring 3 and the outer ring 5. An inner peripheral surface of the outer ring 5 is formed with a plurality of concave cams 13 each configured by a trough portion 9 and an inclined surface 11 that are formed in a circumferential direction, and with a plurality of concave grooves 15 formed in an axial direction.

Each roller 7 is disposed between an outer peripheral surface of the inner ring 3 and the concave cam 13 of the outer ring 5, and is biased by an accordion spring 17 against the inclined surface 11 within the concave cam 13. An outer radially outwardly projected edge portion 21 of a block bearing 19 composed of an oil-retaining sintered alloy engages with each concave groove 15, and the block bearing 19 serves to keep an interval between the inner ring 3 and the outer ring 5. What is indicated by a numeral 22 in the drawings is an engaging protruded portion formed on the outer periphery of the outer ring 5. This engaging protruded portion 22 engages with an engaging groove formed in an inner peripheral surface of an unillustrated transmission-related element.

The outer ring 5 in this embodiment is fitted with a retainer 23 composed of a synthetic resin, which takes substantially the same configuration as that in the conventional apparatus. This retainer 23 prevents the rollers 7, the accordion springs 17 and the block bearings 19 from separating and coming off. The retainer 23 is configured by connecting a first annular flange 25 having a large diameter to a second annular flange 27 having a small diameter by columns 29, 31, 33, 35 extending in the axial direction. In this retainer 23, a couple of the roller 7 and the accordion spring 17 are interposed and held in between the columns 29 and 35 adjacent to each other in the peripheral direction, between the columns 31 and 33 adjacent to each other in the peripheral direction, and between the columns 33 and 35 adjacent to each other in the peripheral direction, and the block bearing 19 is interposed and held in between the columns 29 and 31 adjacent to each other in the peripheral direction.

FIG. 1 is the view showing the retainer with some portion cut off, wherein the above configuration of the columns, etc. is formed round over the whole outer periphery of the inner ring 3.

According to this embodiment, the concave groove 15 with which the outer edge portion 21 of the block bearing 19 engages is, as shown in FIG. 4, formed of two side surfaces L1, L1 extending in radial directions at both ends in the peripheral direction, one bottom surface L2 extending in the peripheral direction, flat surfaces L3, L3 interposed respectively between the side surfaces L1, L1 and the bottom surface L2, and circular arcs R1, R2, respectively, connecting the side surface L1 to the flat surface L3 that are adjacent to each other and connecting the flat surface L3 to the bottom surface L2 that are adjacent to each other. Further, an inclined angle A made by the flat surface L3 and the side surface L1 interposed between the side surface L1 and the bottom surface L2 adjacent to each other and an inclined angle B made by the bottom surface L2 and the flat surface L3 adjacent to each other, are set so as to fall within a range of $90°<A<180°$ and $90°<B<180°$.

The concave groove 15 is formed in the shape described above, thereby enabling a concentration of the stresses to be relieved, facilitating permeation of a lubricating oil into the concave groove 15, reducing fatigue fractures in the block bearing 19 and in the concave groove 15, and making it possible to attain a longer life-time of the one-way clutch 1.

Note that the mode of the present invention is not limited to this embodiment. For example, the circular cylindrical rollers are used as the torque transfer members in the embodiment discussed above, however, steel balls, etc. may also be adopted in place of the rollers. Moreover, the specific configurations, etc. of the members from the elastic pressing member down to the retainer, the inner and outer rings and the concave groove, are not confined to those described in the embodiment discussed above and can be properly changed depending on a convenience in design and so on.

As discussed above, according to the present invention, the one-way-clutch apparatus that attains the longer life-time can be provided.

What is claimed is:

1. A one-way clutch apparatus comprising:

an inner ring;

an outer ring disposed so as to be coaxial with said inner ring and rotatable relatively thereto;

a plurality of concave grooves formed in an axial direction in an inner peripheral surface of said outer ring; and block bearings engaging said respective concave grooves and keeping an interval between said inner ring and said outer ring, wherein each said concave groove includes a bottom surface extending in a peripheral direction and two radially extending side surfaces opposed to each other, each side surface being connected to the bottom surface by a connecting surface including a first circular arc surface connected to the side surface, a second circular arc surface connected to a peripheral end of the bottom surface and a flat surface connected to the first circular arc surface and the second circular arc surface.

2. A one-way clutch apparatus, comprising:

an inner ring;

an outer ring disposed so as to be coaxial with said inner ring and rotatable relatively thereto;

a plurality of concave grooves formed in an axial direction in an inner peripheral surface of said outer ring; and block bearings engaging said respective concave grooves and keeping an interval between said inner ring and said outer ring, wherein each said concave groove takes such a configuration that side surfaces extending in radial directions are each connected to a bottom surface extending in a peripheral direction by one or more flat surfaces and two or more circular arc surfaces.

3. A one-way clutch apparatus according to claim 2, wherein each of the one or more flat surfaces has an inclined angle B having a relationship $90°<B<180°$ with respect to the bottom surface extending in the peripheral direction.

4. A one-way clutch apparatus according to claim 3, wherein each of the one or more flat surfaces has an inclined angle A having a relationship $90°<A<180°$ with respect to the corresponding side surface.

5. A one-way clutch apparatus according to claim 2, wherein each of the one or more flat surfaces has an inclined angle A having a relationship $90°<A<180°$ with respect to the corresponding side surface.

6. A one-way clutch apparatus comprising:

an inner ring;

an outer ring disposed so as to be coaxial with said inner ring and rotatable relatively thereto;

a concave groove formed in an axial direction in an inner peripheral surface of said outer ring; and a block bearing engaging said concave groove, wherein said concave groove includes side surfaces connected to a bottom surface extending along a peripheral direction by respective connecting surfaces each including a flat surface and two or more curved surfaces.

7. A one-way clutch apparatus according to claim 6, wherein each connecting surface comprises the flat surface and two arcuate surfaces.

8. A one-way clutch apparatus according to claim 7, wherein the flat surface has an inclined angle B having a relationship $90°<B<180°$ with respect to the bottom surface.

9. A one-way clutch apparatus according to claim 8, wherein the flat surface has an inclined angle A having a relationship $90°<A<180°$ with respect to the corresponding side surface.

10. A one-way clutch apparatus according to claim 7, wherein the flat surface has an inclined angle A having a relationship $90°<A<180°$ with respect to the corresponding side surface.

11. A one-way clutch apparatus according to claim 6, wherein said side surfaces extend in radial directions.

12. A one-way clutch apparatus according to claim 11, wherein each connecting surface comprises the flat surface and two arcuate surfaces.

13. A one-way clutch apparatus according to claim 12, wherein the flat surface has an inclined angle B having a relationship $90°<B<180°$ with respect to the bottom surface.

14. A one-way clutch apparatus according to claim 13, wherein the flat surface has an inclined angle A having a relationship $90°<A<180°$ with respect to the corresponding side surface.

15. A one-way clutch apparatus according to claim 12, wherein the flat surface has an inclined angle A having a relationship $90°<A<180°$ with respect to the corresponding side surface.

16. A one-way clutch apparatus comprising:

an inner ring;

an outer ring disposed so as to be coaxial with said inner ring and rotatable relatively thereto;

a concave groove formed in an axial direction in an inner peripheral surface of said outer ring; and a block bearing engaging said concave groove, wherein said concave groove includes side surfaces connected to a bottom surface extending along a peripheral direction by respective connecting surfaces each including two or more curved surfaces having different curvatures.

17. A one-way clutch apparatus according to claim 16, wherein the curved surfaces are arcuate surfaces.

18. A one-way clutch apparatus according to claim 16, wherein each connecting surface includes at least one flat surface.

19. A one-way clutch apparatus according to claim 18, wherein the flat surface is between two curved surfaces.

* * * * *